(12) United States Patent
Yearsley et al.

(10) Patent No.: US 6,798,713 B1
(45) Date of Patent: Sep. 28, 2004

(54) IMPLEMENTING SOFTWARE BREAKPOINTS

(75) Inventors: Gyle D. Yearsley, Boise, ID (US); Joshua J. Nekl, Boise, ID (US)

(73) Assignee: ZiLOG, Inc., San Jose, CA (US)

( * ) Notice: Subject to any disclaimer, the term of this patent is extended or adjusted under 35 U.S.C. 154(b) by 117 days.

(21) Appl. No.: 10/356,265

(22) Filed: Jan. 31, 2003

(51) Int. Cl.$^7$ .................................................. G11C 8/00
(52) U.S. Cl. .............................. 365/238.5; 365/230.03; 365/185.11; 714/35
(58) Field of Search .................. 365/238.5, 230.03, 365/230.01, 185.11; 714/35; 717/124

(56) References Cited

U.S. PATENT DOCUMENTS

| | | | |
|---|---|---|---|
| 5,737,516 A | * | 4/1998 | Circello et al. ............... 714/38 |
| 6,035,422 A | * | 3/2000 | Hohl et al. ................... 714/35 |

* cited by examiner

*Primary Examiner*—Richard Elms
*Assistant Examiner*—N. Nguyen
(74) *Attorney, Agent, or Firm*—Silicon Edge Law Group LLP; T. Lester Wallace; Darien K. Wallace

(57) ABSTRACT

Program code for a Processor is stored in a non-volatile memory (for example, flash memory). An individual data bit stored in a memory cell of the non-volatile memory can be changed from an unprogrammed state to a programmed state using a write cycle. An individual bit stored in the memory cannot, however, be changed from the programmed state back to the unprogrammed state without performing an erase cycle on all the bits of a page of memory cells. The processor has an instruction set that includes a multi-bit breakpoint instruction, all the bits of which are the programmed state. Because all the bits of the breakpoint instruction are the programmed state of the memory, the breakpoint instruction can be written over any other instruction that is stored in the memory without having to perform an erase cycle or erase an entire page of program code.

27 Claims, 2 Drawing Sheets

IMPLEMENTING SOFTWARE BREAKPOINTS

TECHNICAL FIELD

The present invention relates to setting breakpoints in program code.

BACKGROUND

In testing, debugging and developing software for a processor system, it is often desired to be able to stop the processor's execution of instructions at a specific place in the software code. One conventional approach of accomplishing this function involves providing a register and a multi-bit comparator. The comparator compares a multi-bit address value stored in the register with a multi-bit address value present on the address bus of the processor. The output of the comparator is a halt signal that is supplied to the processor. To set a breakpoint to stop the processor at a particular address, the user writes the address into the register. The processor is then started executing the instructions of the program. When the processor reaches the instruction that is stored at the address value in the register, the comparator determines that the address value in the register is the same value that is on the address bus of the processor. The comparator therefore outputs the halt signal and the halt signal in turn stops the processor. An external debugging tool is commonly provided whereby the user can determine the contents of the halted processor's internal registers. This approach that uses a register and comparator is sometimes called a hardware breakpoint. Because a significant amount of hardware is required to provide a hardware breakpoint, the number of such hardware breakpoints provided on a very low-cost processor might be limited.

Another conventional approach to providing a breakpoint is called a software breakpoint. One of the operation codes (opcodes) of the processor is a breakpoint instruction opcode. This instruction opcode may, in some systems, be an illegal instruction that is not used in the instruction set. In other systems it is an opcode of a legitimate instruction of the instruction set that is executed by the processor. When the processor fetches this particular opcode from program memory and decodes it, the processor detects the breakpoint instruction and takes a particular action. The particular action may, for example, be to halt. In another example, the processor may jump to a particular location. In another example, the processor may signal that the processor has reached a breakpoint instruction.

To place a software breakpoint into a program that is being debugged, the user typically overwrites a particular instruction of the program code in memory with the breakpoint instruction. The processor is then started to execute the program code. When the processor fetches and decodes the breakpoint instruction, the processor halts and performs the operation to be performed by the breakpoint instruction. Again, as in the hardware breakpoint example, a debugging tool is then often used to determine the contents of the processor's internal registers or to otherwise determine the state of the system. Because many such software breakpoints can be set using the same hardware on the processor, this approach is often suitable for use on a very low cost processor.

In some systems, the processor fetches and executes instructions out of a programmable non-volatile memory such as, for example, a flash memory. The data bit in each memory cell of the flash memory can have one of two states, either the programmed state or the unprogrammed state. The data bits of the flash memory are initially all in the unprogrammed state. A particular word of memory cells can then be written such that some or all of the bits of the word are changed to the programmed state. An individual bit within a memory cell cannot, however, be changed from the programmed state back to the unprogrammed state with a write operation. To change a bit back to the unprogrammed state, a large group of bits (called a "page" or a "block") containing the bit to be changed is "erased" in a single erase operation. The erase operation results in all the bits in the page having the unprogrammed state.

Accordingly, when a software breakpoint instruction is to be written over another instruction in the program code, and where the program code is stored in flash memory, it generally is necessary to change some of the bits from the programmed state to the unprogrammed state. Accordingly, the page of flash memory that contains the instruction to be overwritten is erased. This may be done by erasing one page of the flash in a page erase operation, or may be done by erasing the entire flash device in what is called a bulk erase operation. Once the page of flash memory is erased, the page of program code previously stored in the page of the memory is rewritten back into the page of memory except that the breakpoint instruction is now in place of the instruction to be overwritten.

This method of inserting a breakpoint instruction into program code is undesirable in certain respects. First, a memory cell of flash memory has a limited number of times it can be erased. The erase and rewrite process of inserting a breakpoint instruction is undesirable in that it uses up some of the erase and rewrite cycles of the flash memory cells. Second, the erase and rewrite process is cumbersome and slow. Depending on the flash technology employed and the amount of memory to be rewritten, it may take as much as a few seconds to perform one erase and rewrite operation. Where the memory used to store the program code is not flash, but rather is a programmable read only memory (PROM) that is erased by exposure to ultraviolet light, it may take up to twenty minutes to perform one erase and rewrite operation. Setting and removing such software breakpoints is therefore somewhat cumbersome.

SUMMARY

Program code for a processor is stored in a programmable non-volatile memory. The programmable non-volatile memory has a plurality of memory cells. A bit of data stored in one of these memory cells can either have a programmed state or an unprogrammed state. An individual bit of data stored in a memory cell can be changed from the unprogrammed state to the programmed state by writing an appropriate value into a word of memory cells using a write cycle. An individual bit stored in the memory cannot, however, be changed from the programmed state back to the unprogrammed state without erasing all the bits of a page of memory cells. Such a non-volatile memory can, for example, be a flash memory or an erasable programmable read only memory (EPROM) that is erased by exposure to ultraviolet light.

In accordance with one embodiment of the present invention, the processor has an instruction set that includes a breakpoint instruction, where the opcode for the breakpoint instruction is a multi-bit value, all the bits of which are the programmed state. If the breakpoint instruction is an eight-bit instruction, and if the programmed state of the memory is a digital "0", then the breakpoint instruction is "0000 0000".

A breakpoint instruction in accordance with this embodiment of the present invention can therefore be written over any other instruction that might be present in the non-volatile memory using a write cycle. A write cycle can be used because no bit to be overwritten is to change from the programmed state to the unprogrammed state. Rather, the only bits that change are ones that are to change from the unprogrammed state to the programmed state. The breakpoint instruction can therefore be inserted into the program code without having to erase one or more pages of code stored in the non-volatile memory.

In some embodiments, execution of the breakpoint instruction causes the processor to halt and a debug acknowledge signal to be output automatically onto a terminal of the processor. The debug acknowledge signal is used to alert an external debugging tool that the processor has stopped at a breakpoint. On-chip debugger hardware is provided on the same integrated circuit as the processor. The on-chip debugger hardware allows the processor to "step over" the breakpoint and to continue on executing instructions of the program code. To step over the breakpoint, the on-chip debugger hardware stuffs into the processor the instruction that was previously overwritten when the breakpoint instruction was inserted into the program code. Once the previously overwritten instruction has been stuffed into the processor, the on-chip debugger hardware restarts the processor. When the processor restarts, the processor executes the instruction and then continues on executing subsequent instructions of the program code in ordinary fashion. The processor therefore resumes operation in the same state as if the processor had never stopped at the breakpoint instruction.

The breakpoint instruction may be removed by erasing the entire page of non-volatile memory that stored the breakpoint instruction, and then rewriting the page of program code back into the erased page of memory. When the program code is written back, the breakpoint instruction is omitted and the instruction that had been previously overwritten is included in the place of the breakpoint instruction.

In cases where the memory is a programmable read only memory (PROM) or a one time programmable (OTP) memory whose bits cannot be erased, a first device is used for debugging. The device, for example, may include a processor and a portion of memory whose bits cannot be erased. The program code with certain words overwritten with the fully programmed state breakpoint instruction is stored in the portion of memory. After debugging, this programmed device can be discarded. The debugged program code without the breakpoint instructions is then written into a second otherwise identical device.

Other features, embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figures 1, 2:
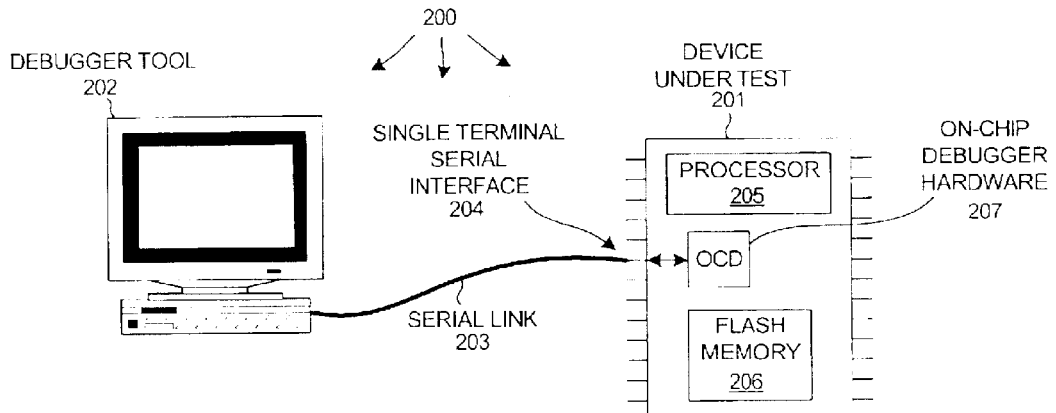
FIG. 1 (prior art) is diagram showing a portion of program code both before and after a "fully programmed state breakpoint instruction" is inserted.
FIG. 2 is a simplified diagram of a system in accordance with an embodiment of the present invention.

FIG. 1 is a simplified diagram in accordance with an embodiment of the present invention wherein a processor fetches and executes instructions out of a programmable non-volatile memory. The memory cells of the programmable non-volatile memory can be programmed to a programmed state one bit at a time, but the memory cells can only be erased to an unprogrammed state one or more pages at a time.

In the example of FIG. 1, the unprogrammed state is a digital "1". The programmed state is a digital "0". The memory is organized as an array of eight-bit words. An eight-bit word of data can be written into an eight-bit word of the non-volatile memory such that an individual bit of the word is changed from the unprogrammed state to the programmed state. Once a bit is set to the programmed state, however, the bit can only be set back to the unprogrammed state by performing an erase cycle. The erase cycle erases not just the particular bit of interest, but also erases all the other bits on the same page of the non-volatile memory. The bit can also be set back to the unprogrammed state by simultaneously erasing all pages of the memory device in what is called a bulk erase cycle.

The top portion of FIG. 1 illustrates a portion of program code present in the programmable non-volatile memory. The instructions are multi-word instructions. The first word of each instruction includes the opcode. To insert a breakpoint into this code, the first word of an instruction is overwritten with the breakpoint instruction. In the example of FIG. 1, the word being overwritten is designated by reference numeral 100. The breakpoint instruction in this example is a single eight-bit word, all the bits of which are the programmed state. The breakpoint instruction is therefore "0000 0000". Because all the bits of the breakpoint instruction are the programmed state, no bits in a word being overwritten has to be changed from the programmed state to the unprogrammed state. This is true regardless of what the word being overwritten is. As a result, the breakpoint instruction can be written over any selected instruction or value in memory using a memory write cycle. The entire page of the non-volatile memory need not be erased and rewritten to insert the breakpoint instruction.

The bottom portion of FIG. 1 illustrates the portion of program code after the breakpoint instruction has been inserted. The breakpoint instruction is designed in FIG. 1 with reference numeral 101. Note that the add instruction ADD 100 in the top portion of FIG. 1 has been overwritten with the breakpoint instruction BRK 101 in the bottom portion of FIG. 1.

After insertion of the break point instruction, the processor is started. The processor fetches and executes instructions of the program code until the processor reaches the breakpoint instruction. When the processor fetches and executes the breakpoint instruction 101, the processor performs an associated breakpoint operation. The breakpoint operation may, for example, be to halt execution of instructions and to set a flag or status bit to indicate a breakpoint instruction has been reached.

FIG. 2 is a diagram of a system 200 in accordance with an embodiment of the present invention. Operation of system 200 is described in connection with the flowchart of FIG. 3.

System 200 includes a device under test 201 that is coupled to a debugger tool 202 via a serial link 203.

Debugger tool 202 may, for example, be software executing on a personal computer. The serial link 203 in this embodiment is coupled to a single terminal 204 (for example, a pin) of device under test 201. Device under test 201 is, in this example, a microcontroller integrated circuit such as a Z8 Encore Microcontroller with on-board flash memory available from Zilog Inc., 532 Race Street, San Jose, Calif. 95126. The microcontroller integrated circuit includes a processor portion 205, a flash memory portion 206, and on-chip debugger hardware 207.

Figure 3:
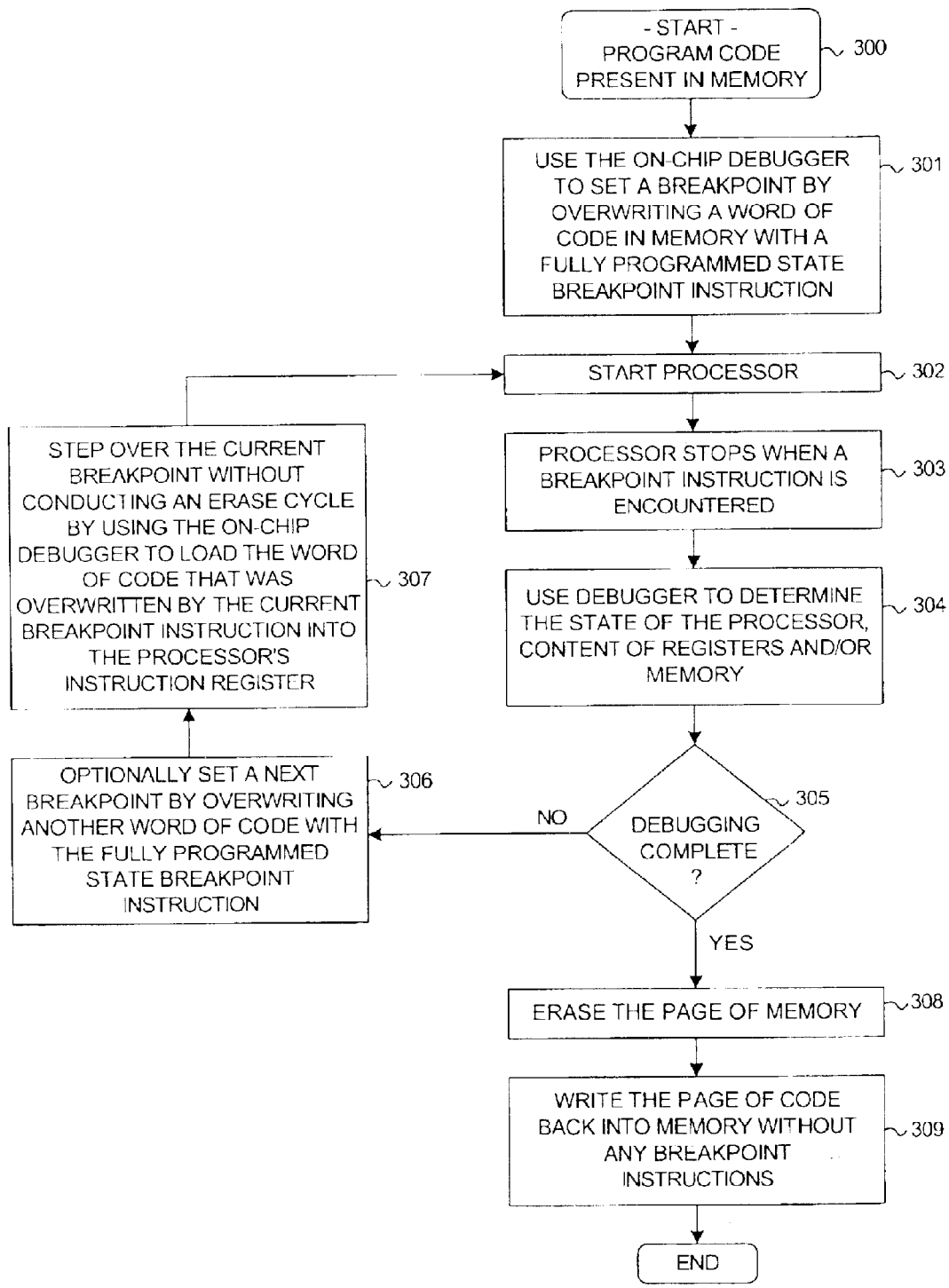
FIG. 3 is a flow-chart of a method in accordance with an embodiment of the present invention.

The method of FIG. 3 starts (step 300) with program code being present in the flash memory portion 206 of the microcontroller. The program code includes a sequence of instructions and values.

Next (step 301), when the processor portion 205 of the microcontroller is halted, the debugger tool 202 and the on-chip debugger hardware 207 are used to set a breakpoint. Debugger tool 202 reads a word of code from a memory location that is identified by the user to be overwritten with a breakpoint instruction. Debugger tool 202 stores this code word for later reference. On-chip debugger hardware 207 overwrites the selected word in flash memory 206 with the breakpoint instruction. All the bits of the breakpoint instruction are the programmed state of the flash memory. The breakpoint instruction is therefore referred to as the "fully programmed state breakpoint instruction." In the present example, the unprogrammed state of flash memory 206 is "1", so the fully programmed state of the eight-bit code word is "0000 0000".

Because any eight-bit value previously stored in the memory location to be overwritten can be overwritten with the fully programmed state eight-bit code, the overwriting of the previous value is done using an ordinary flash memory write cycle. It is therefore seen that the breakpoint instruction is set in accordance with one aspect of the invention by writing only the breakpoint instruction into flash and without having to perform a page erase cycle or a bulk erase cycle.

Once one or more such breakpoint instructions have been set, the processor is started (step 302). This may, for example, be accomplished using the on-chip debugging hardware 207. The on-chip debugging hardware 207 includes an OCD Control Register that can be written to and read from by debugger tool 202 via serial link 203. When a DBGMODE bit of the OCD Control Register is cleared to a digital "0", the on-chip debugger hardware 207 causes the processor portion 205 to start executing instructions. The user therefore uses debugger tool 202 to clear the DBGMODE bit and to start the processor portion executing instructions.

Next (step 303), processor portion 205 stops when it encounters a breakpoint instruction. In some embodiments, the processor stops when it fetches the breakpoint instruction. In other embodiments, the processor stops after executing the breakpoint instruction. In the example of FIG. 3, the processor executes the breakpoint instruction by halting instruction fetching, automatically setting the DBGMODE bit in the OCD Control Register to a digital "1", and entering the debug mode. If a DBGACK bit in the OCD Control Register has been previously set to a digital "1", then the on-chip debugger hardware 207 also sends a debug acknowledge character (FFH) out of terminal 204 to debugger tool 202. This debug acknowledge character serves to alert the debugger tool 202 and the user that the processor has stopped at a breakpoint.

Next (step 304), the user uses debugger tool 202 and on-chip debugger hardware 207 to determine the state of the device under test 201. The user may read or write the contents of registers within processor portion 205, or read or write the contents memory accessible by the processor portion such as random access memory (RAM) or flash memory 206, or control peripherals (not shown) that may be realized as part of microcontroller integrated circuit 201. Memory locations both on the microcontroller integrated circuit 201 as well as external to the microcontroller can be read from and/or written to in this way using debugger tool 202.

Next, if the debugging of the program code is determined (step 305) not to be complete or if the user for another reason wishes to set another breakpoint instruction, then the user-uses debugging tool 202 and on-chip debugger hardware 207 to overwrite another selected word in flash memory 206 with the fully programmed state breakpoint instruction (step 306).

Next (step 307), the user uses debugger tool 202 and on-chip debugger hardware 207 to step over the breakpoint instruction that caused the processor to halt. This is accomplished by debugger tool 202 sending on-chip debugger hardware a stuff command (11H) via serial link 203. The stuff command causes on-chip debugger hardware 207 to stuff an instruction into the instruction register of processor portion 205. The instruction stuffed into processor portion 205 is the instruction that was originally overwritten by the breakpoint instruction (i.e., the code word that was previously stored in debugger tool 202 for later reference). Accordingly, when processor portion 205 is restarted, the processor portion 205 picks up program execution in the same state as if the breakpoint instruction were not encountered. By stepping over the breakpoint instruction and not removing it, the user can go on debugging the program code without having to wait to perform a sometimes time consuming erase cycle to remove the breakpoint instruction. In this fashion, the user debugs and optimizes system and software operation.

Next, when the debugging is determined to be complete or a breakpoint is for some other reason to be removed (step 305), the entire page of flash memory 206 where the breakpoint instruction is stored is erased (step 308). This erasing may, for example, be the erasing of just one page using a page erase cycle. This erasing can also be the erasing of all the pages of flash memory 206 in a bulk erase cycle. Regardless of which erase cycle is used, the erasing results in all bits in the page that contained the breakpoint instruction being erased to the unprogrammed state.

Next (step 309), the page (or pages) of program code that was present in the page of flash memory 206 that was erased is rewritten back into that page of flash memory 206. The breakpoint instruction is, however, not rewritten. Rather, in the place of the breakpoint instruction is the original program instruction or value that was previously overwritten when the breakpoint was inserted into the code. The method of FIG. 3 therefore concludes with the breakpoint having been effectively removed from the program code in flash memory 206.

Although the present invention is described in connection with certain specific embodiments for instructional purposes, the present invention is not limited thereto. The breakpoint instruction can be set by overwriting only a portion of another instruction. The breakpoint instruction can be set without overwriting an instruction, but rather the breakpoint instruction can be included with the original program code written into the non-volatile memory. A breakpoint instruction can be inserted by writing the breakpoint instruction into a previously unused portion of memory. Although the present invention is described in connection with a flash memory technology where an individual memory cell can store one of two states (the programmed state and the unprogrammed state), there are flash memory technologies where an individual memory cell can store multiple bits of data. One combination of these bits represents the fully programmed state, and another combination of these bits represents the fully erased state. The method and breakpoint instruction set forth above applies to these flash memory technologies in that the breakpoint instruction is set by programming each memory cell used to store the breakpoint instruction to its fully programmed state. Where no instruction of the instruction set of the processor has one of the instruction bits at the programmed state, this particular bit of the breakpoint instruction need not be defined to be the programmed state.

The fully programmed state breakpoint instruction also sees use where breakpoints are to be set into program code that is stored in an erasable Programmable read only memory (EPROM), a programmable read only memory (PROM) or a one time programmable (OTP) memory device. An example of an OTP memory device is an antifuse memory device. To set a breakpoint, a word of the program code is overwritten with the fully programmed state breakpoint instruction. Multiple breakpoints can be set into the code in this manner. During debugging, a breakpoint instruction can be stepped over as described above. Once debugging is complete, rather than erasing the memory and reprogramming it as was described above, the device having the processor and memory may be discarded. The debugged code is then written into the PROM or OTP memory of an identical device without the breakpoint instructions. Accordingly, various modifications, adaptations, and combinations of various features of the described embodiments can be practiced without departing from the scope of the invention as set forth in the claims.

What is claimed is:

1. A circuit comprising:
   a memory having a plurality of bits organized into words, a plurality of the words forming a page, wherein each bit has a programmed state and an unprogrammed state, wherein an individual word can be written such that a bit of the word is written with the programmed state, but wherein all the bits of all the words of the page must be erased into the unprogrammed state together if any of the bits of the page is erased from the programmed state to the unprogrammed state; and
   a processor that executes a breakpoint instruction, the breakpoint instruction being a plurality of bits stored in the memory, wherein each of the bits of the plurality of bits of the breakpoint instruction is in the programmed state.

2. The circuit of claim 1, wherein the circuit is an integrated microcontroller circuit, and wherein the memory is taken from the group consisting of: a flash memory, and an erasable programmable read only memory (EPROM).

3. The circuit of claim 1, wherein the circuit is an integrated circuit, the circuit further comprising:
   on-chip debugging hardware that communicates to a debugging tool external to the circuit an indication that the processor has executed the breakpoint instruction.

4. The circuit of claim 3, wherein the on-chip debugging hardware can stuff an instruction into an instruction register of the processor and cause the processor to execute the instruction.

5. The circuit of claim 1, wherein the processor halts upon executing the breakpoint instruction.

6. The circuit of claim 1, wherein the processor sets a bit in a status register upon executing the breakpoint instruction.

7. The circuit of claim 1, wherein the circuit is an integrated circuit and the integrated circuit has a terminal, and wherein a signal is output onto the terminal upon execution of the breakpoint instruction.

8. The circuit of claim 7, wherein the signal output onto the terminal is indicative of the processor having executed the breakpoint instruction.

9. The circuit of claim 1, wherein the circuit is an integrated circuit, the integrated circuit further comprising:
   a terminal; and
   hardware debugging circuitry capable of reading a content of a register within the processor and then communicating the content out of the integrated circuit via the terminal in the form of a serial bit stream.

10. The circuit of claim 9, wherein the processor halts upon execution of the breakpoint instruction, the hardware debugging circuitry being capable of communicating the content out of the integrated circuit when the processor is halted.

11. The circuit of claim 9, wherein the hardware debugging circuitry is capable of writing a selected instruction into an instruction register of the processor after the processor has executed the breakpoint instruction, and wherein the hardware debugging circuitry is then able to cause the processor to execute the selected instruction.

12. The circuit of claim 9, wherein the hardware debugging circuitry is in communication with a debugging tool external to the circuit, the debugging tool causing the breakpoint instruction to be written over another instruction that was stored in the memory, and wherein the debugging tool stores the instruction that was overwritten, the debugging tool then communicating the instruction that was overwritten back to the circuit such that the overwritten instruction is stuffed into the processor, the processor then executing the instruction that was overwritten.

13. The circuit of claim 1, wherein the breakpoint instruction is a single word.

14. The circuit of claim 1, wherein the breakpoint instruction is a plurality of words.

15. A method, comprising:
   storing a plurality of instructions in a memory, the memory having a plurality of memory cells organized into words, a plurality of the words forming a page, wherein each memory cell stores a bit that can either have a programmed state or an unprogrammed state, wherein an individual word can be written such that an individual bit of the word is written with the programmed state, but wherein all the bits of all the words of the page must be erased together if any of the bits of the page is erased from the programmed state into the unprogrammed state; and
   overwriting an instruction stored in the memory with a breakpoint instruction, the breakpoint instruction being a plurality of bits stored in the memory, wherein each of the bits of the plurality of bits of the breakpoint instruction has the programmed state.

16. The method of claim 15, wherein the memory is taken from the group consisting of: a flash memory, and an erasable programmable read only memory (EPROM).

17. The method of claim 15, further comprising:
   executing the breakpoint instruction on a processor such that the processor halts in response to executing the breakpoint instruction.

18. The method of claim 17, wherein the processor is part of an integrated circuit, the method further comprising:

communicating first information out of the integrated circuit, the first information indicating that the processor has executed the breakpoint instruction.

19. The method of claim 18, wherein the processor includes a register, the method further comprising:

communicating second information out of the integrated circuit, the second information being indicative of a content of the register of the processor.

20. The method of claim 18, wherein the processor accesses an amount of random access memory (RAM), the method further comprising:

communicating second information out of the integrated circuit, the second information being indicative of a content of a word of the RAM.

21. The method of claim 17, further comprising:

after the processor has executed the breakpoint instruction then loading the overwritten instruction into an instruction register of the processor; and causing the processor to execute the overwritten instruction.

22. The method of claim 21, further comprising:

erasing all the memory cells of all the words of the page of the memory and then writing the plurality of instructions back into the memory such that the overwritten instruction is stored in the memory and such that the breakpoint instruction does not overwrite the overwritten instruction.

23. A method, comprising:

setting a breakpoint in program code by overwriting an instruction of the program code with a breakpoint instruction, the program code being stored in a programmable non-volatile memory;

storing the overwritten instruction;

executing the program code on a processor until the processor halts at the breakpoint; and stepping over the breakpoint without erasing the breakpoint instruction from the memory by loading the stored overwritten instruction into the processor and then executing the stored overwritten instruction on the processor.

24. The method of claim 23, wherein the programmable non-volatile memory is a flash memory, the flash memory and the processor being disposed on a single integrated circuit.

25. The method of claim 24, wherein the overwritten instruction is stored external to the integrated circuit.

26. The method of claim 25, wherein a debugging tool external to the integrated circuit is used to set the breakpoint, wherein the overwritten instruction is stored in the debugging tool, and wherein the debugging tool is used to step over the breakpoint by transferring the stored overwritten instruction from the debugging tool and to the processor.

27. The method of claim 26, wherein the flash memory comprises a plurality of memory cells, each of the memory cells storing a bit, the bit having either a programmed state or an unprogrammed state, the breakpoint instruction being a multi-bit instruction all the bits of which are the programmed state.

* * * * *